(12) United States Patent
Wu

(10) Patent No.: US 8,840,321 B2
(45) Date of Patent: Sep. 23, 2014

(54) CABLE ASSEMBLY WITH ELECTRICAL AND OPTICAL TRANSMITTING

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 645 days.

(21) Appl. No.: 13/118,592

(22) Filed: May 31, 2011

(65) Prior Publication Data

US 2011/0293227 A1  Dec. 1, 2011

(30) Foreign Application Priority Data

May 31, 2010  (CN) .......................... 2010 1 0187153

(51) Int. Cl.
| | |
|---|---|
| *G02B 6/36* | (2006.01) |
| *H01R 13/66* | (2006.01) |
| *H01R 13/6593* | (2011.01) |
| *H01R 24/60* | (2011.01) |
| *G02B 6/38* | (2006.01) |
| *H01R 4/30* | (2006.01) |
| *H01R 107/00* | (2006.01) |
| *H01R 13/6471* | (2011.01) |
| *H01R 13/6594* | (2011.01) |

(52) U.S. Cl.
CPC ........ *H01R 13/6658* (2013.01); *H01R 13/6593* (2013.01); *H01R 4/30* (2013.01); *H01R 24/60* (2013.01); *H01R 2107/00* (2013.01); *H01R 13/6471* (2013.01); *H01R 13/6594* (2013.01); *G02B 6/3817* (2013.01)

USPC .......................................................... 385/89

(58) Field of Classification Search
None
See application file for complete search history.

(56) References Cited

U.S. PATENT DOCUMENTS

| | | | |
|---|---|---|---|
| 6,909,821 B2 * | 6/2005 | Ravasio et al. ................... | 385/24 |
| 7,267,579 B1 | 9/2007 | Wu | |
| 7,558,460 B2 * | 7/2009 | Yamaguchi et al. .......... | 385/139 |
| 7,609,930 B2 * | 10/2009 | Aoyagi et al. ................ | 385/128 |
| 7,651,379 B1 | 1/2010 | Wu | |
| 7,717,733 B1 | 5/2010 | Yi et al. | |
| 2006/0045435 A1 * | 3/2006 | Kambe et al. ................... | 385/92 |
| 2008/0044141 A1 | 2/2008 | Willis | |
| 2010/0321591 A1 * | 12/2010 | Onomatsu ..................... | 348/737 |
| 2011/0249948 A1 | 10/2011 | Wu | |

* cited by examiner

*Primary Examiner* — Tina Wong
(74) *Attorney, Agent, or Firm* — Wei Te Chung; Ming Chieh Chang

(57) ABSTRACT

An cable assembly (100) includes an insulative housing (1); a first terminal module (21) and a second terminal module (22) assembled to the insulative housing, the first terminal module (21) having first terminals (212*a*) and first additional terminals (212*b*), the second terminal module (22) having second terminals (222*a*) and second additional terminals (222*b*); a photoelectric conversion device (93) electrically connected with the first terminals and the second terminals; and a cable (6) including fiber wires (63) and copper wires (61), the fiber wires optically connected to photoelectric conversion device, the copper wires electrically connected to the first additional terminals and the second additional terminals.

17 Claims, 8 Drawing Sheets

CABLE ASSEMBLY WITH ELECTRICAL AND OPTICAL TRANSMITTING

FIELD OF THE INVENTION

The present invention generally relates to a cable assembly, and more particularly to a cable assembly adapted for electrical and optical transmitting.

DESCRIPTION OF PRIOR ART

Nowadays, an electrical device has become lower profile and multi-functional, and a cable assembly for the electrical device is required lower profile and capable of high-speed transmitting.

Cable assemblies in accordance with USB, SATA, HDMI, SAS and Displayport protocol have been widely applied in different kinds of electronic devices. The aforementioned cable assemblies depend on metallic terminals and copper wires to achieve electrical signal transmitting. However, transmitting speed is limited via electrical signal transmitting. In other aspect, as transmitting speed increasing, a structure of the cable assembly becomes complex, and a total dimension of the cable assembly is increasing.

Hence, an improved cable assembly is highly desired to overcome the aforementioned problems.

SUMMARY OF THE INVENTION

Accordingly, an object of the present invention is to provide a lower profile cable assembly capable of transmitting both electrical signal and optical signal.

In order to achieve the object set forth, a cable assembly in accordance with the present invention comprises an insulative housing; a first terminal module and a second terminal module assembled to the insulative housing, the first terminal module having first terminals and first additional terminals, the second terminal module having second terminals and second additional terminals; a photoelectric conversion device electrically connected with the first terminals and the second terminals; and a cable including fiber wires and copper wires, the fiber wires optically connected to photoelectric conversion device, the copper wires electrically connected to the first additional terminals and the second additional terminals.

Other objects, advantages and novel features of the invention will become more apparent from the following detailed description when taken in conjunction with the accompanying drawings.

DETAILED DESCRIPTION OF PREFERRED EMBODIMENTS

Figure 1:
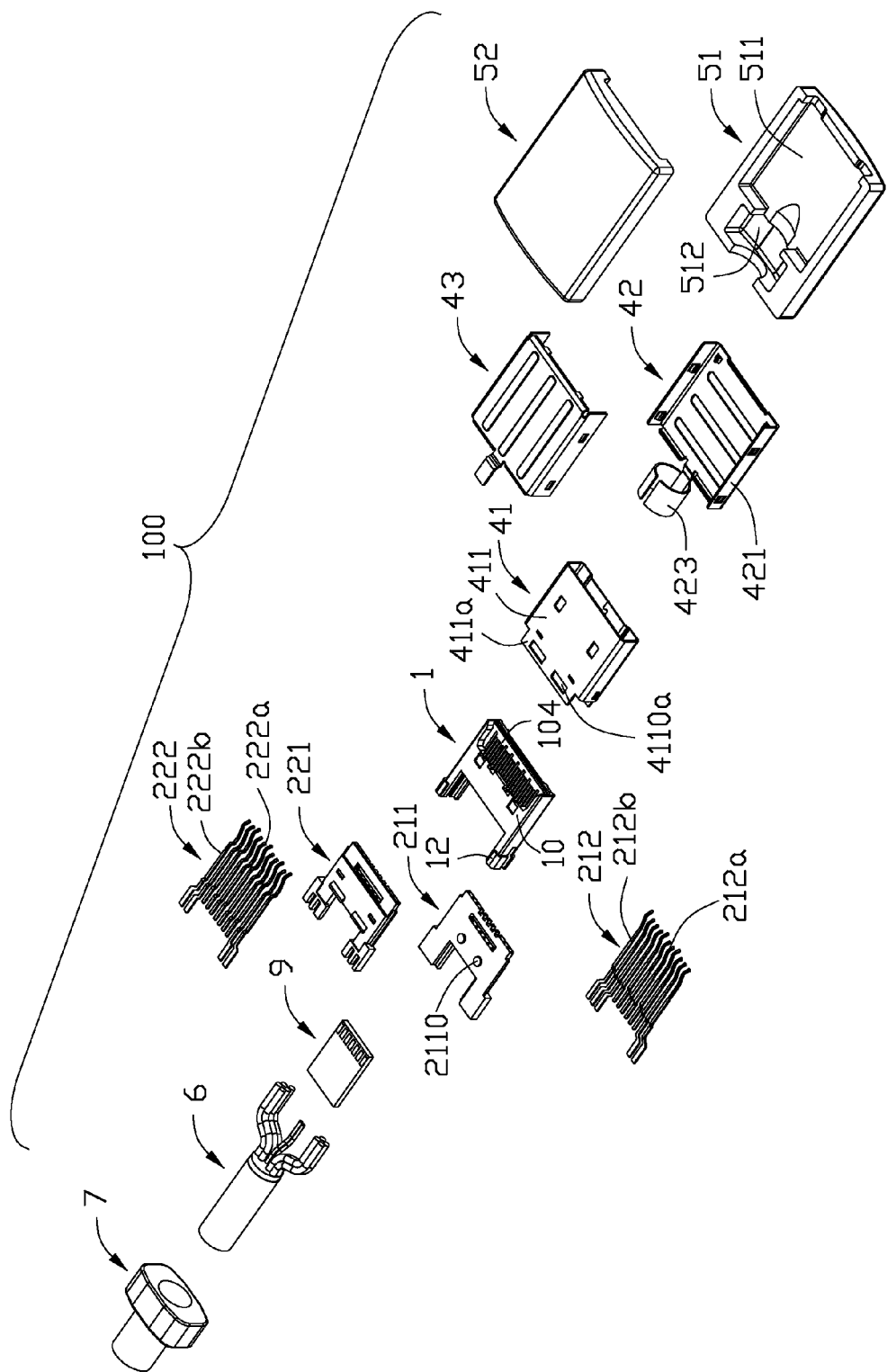
FIG. 1 is an exploded, perspective view of a cable assembly in accordance with the present invention.
Figure 2:
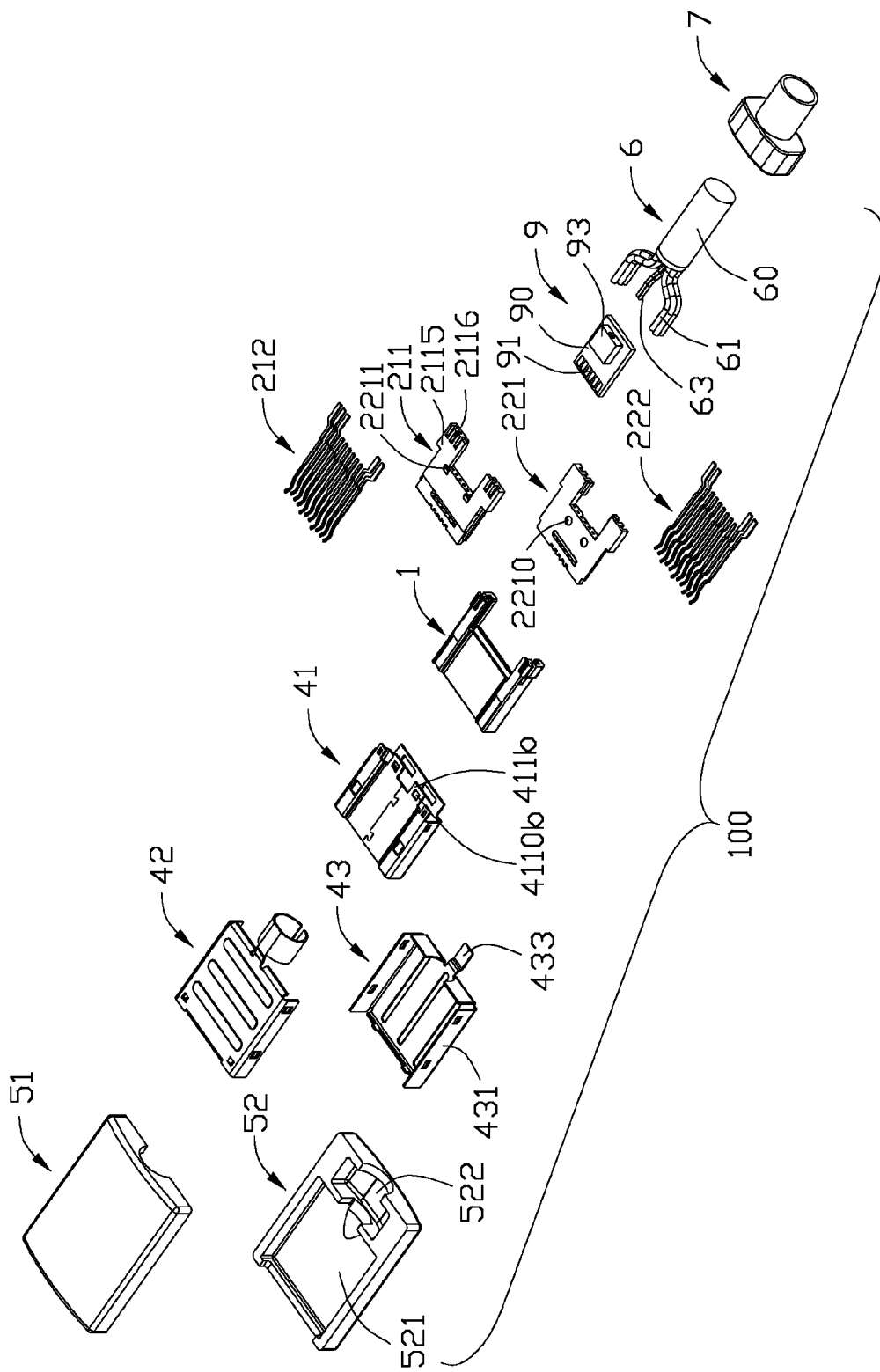
FIG. 2 is similar to FIG. 1, but viewed from another aspect.

Reference will now be made in detail to the preferred embodiment of the present invention.

Referring to FIGS. 1-8, a cable assembly 100 in accordance with the present invention comprises an insulative housing 1, a terminal module 2, a metallic shell 4, an external cover 5, a cable 6, a strain relief 7 integrally formed with a front section of the cable 6 and a printed circuit board assembly (PCBA) 9.

The insulative housing 1 includes a flat main portion 10 and two mounting arms 12 extending rearwardly from lateral sides of the main portion 10. A mounting recess 102 is recessed forwardly from a middle segment of a rear edge of the main portion 10. A mating cavity 104 is recessed downwardly from a front segment of an upper side of the main portion 10 and further communicates with the mounting recess 102. A depression 105 is defined in a front section of a lower side of the main portion 10. There is a receiving spacer 121 disposed between the two mounting arms 12.

The terminal module 2 includes a first terminal module 21 and a second terminal module 22.

The first terminal module 21 has a first insulator 211 and a first terminals group 212 combined together by insert-molding process. The first terminals group 212 includes six first terminals 212a arranged in a row and five first additional terminals 212b divided into two sets and respectively disposed at opposite sides of the six first terminals 212a. The first terminals 212a includes signal terminals and grounding terminals configured to be longer than the signal terminals. Each terminal of the first terminals group 212 has a contacting portion 2120 disposed in front of an edge of the first insulator 211 and a tail portion 2112 disposed behind the first insulator 211. Two mounting posts 2110 are formed on a top side of the first insulator 211 and two protruding portions 2111 are formed on a bottom side of the first insulator 211. In addition, there are two wing portions 2115 extending backwardly from a back segment of the first insulator 211. The two wing portions 2115 are spaced apart from each other, with tail portions 2112 located therebetween. There are five terminal grooves 2116 located in the two wing portions 2115. Two ribs 2118 attached to inner edges of the two wing portions 2115, respectively. The first additional terminals 212b have contacting portions 2120b disposed in front of the first insulator 211 and tail portions 2122b extending into the terminal grooves 2116, respectively. The tail portions 2122b of the first additional terminals 212b are disposed more backward than the tail portions 2122 of the first terminals 212a.

The second terminal module 22 has a second insulator 221 and a second terminals group 222 combined together by insert-molding process. The second terminals group 222 includes seven second terminals 222a arranged in a row and four second additional terminals 222b divided into two sets and respectively disposed at opposite sides of the seven second terminals 222a. The second terminal 222a includes signal terminals and grounding terminals configured to be longer than the signal terminals. Each terminal of the second terminals group 222 has a contacting portion 2220 disposed in front of an edge of the second insulator 221 and a tail portion 2222 disposed behind the second insulator 221. Two positioning holes 2210 are located in a bottom side of the second insulator 221 and two protruding portions 2211 are formed on a top side of the second insulator 221. In addition, there are two wing portions 2215 extending backwardly from a back segment of the second insulator 221. The two wing portions 2215 are spaced apart from each other, with tail portions 2222 located therebetween. There are four terminal grooves 2216 located in the two wing portions 2215. There are also two ribs 2218 attached to inner edges of the two wing portions 2215, respectively. The second additional terminals 222b have contacting portions 2220b disposed in front of the second insulator 221 and tail portions 2222b extending into the terminal grooves 2216, respectively. The tail portions 2222b of the second additional terminals 222b are disposed more backwardly than the tail portions 2222 of the second terminals 222a.

Figure 3:
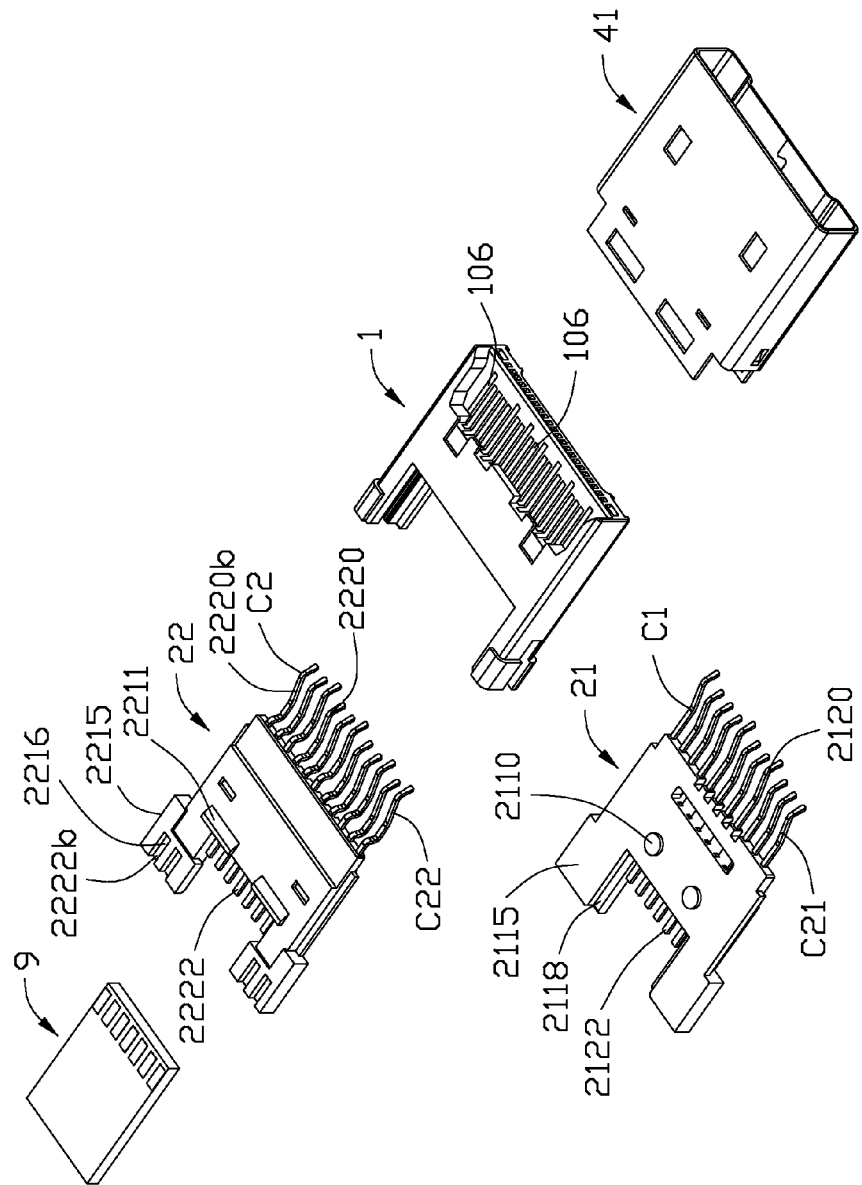
FIG. 3 is a partially assembled view of the cable assembly.
Figure 4:
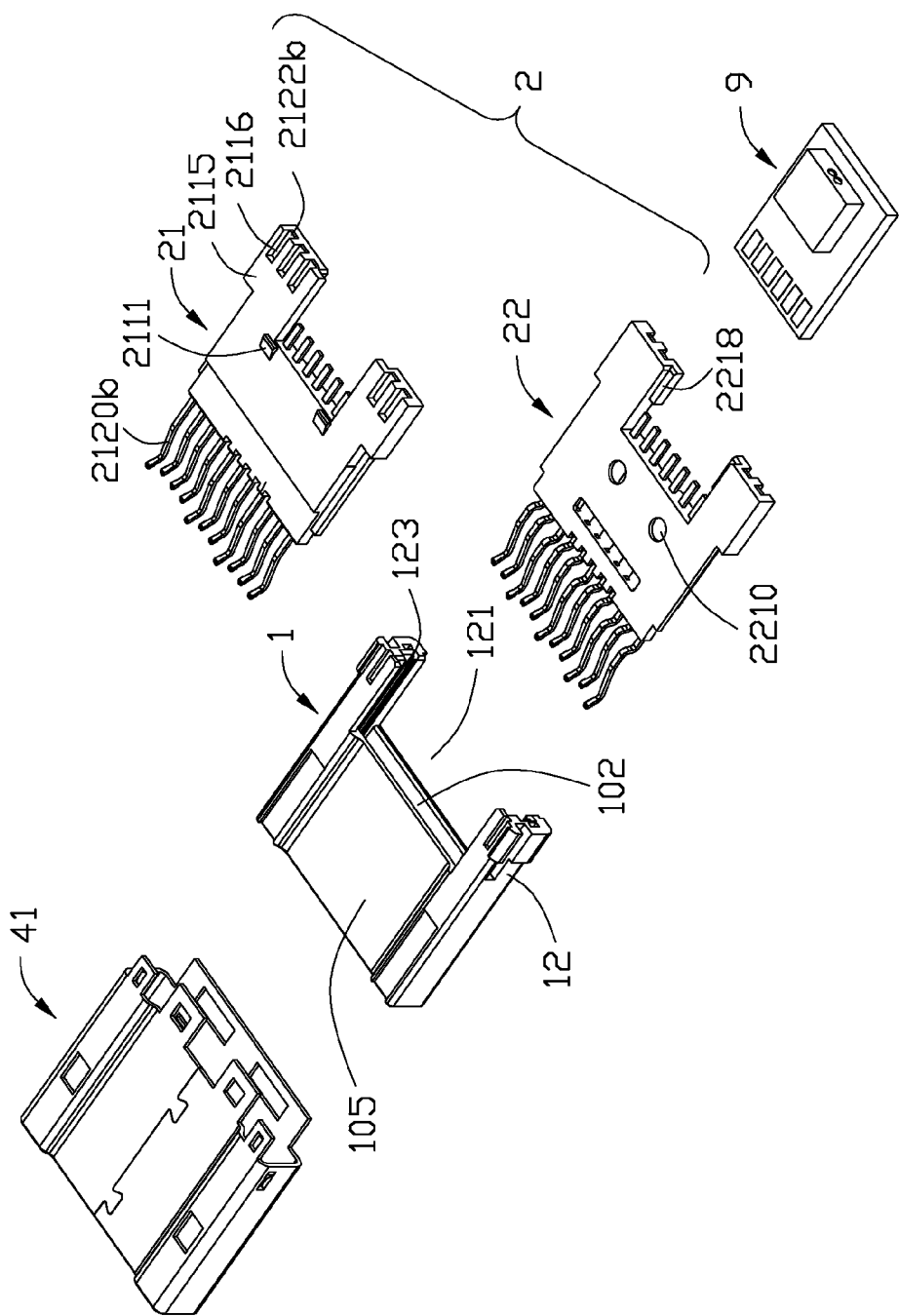
FIG. 4 is similar to FIG. 3, but viewed from other direction.
Figure 5:
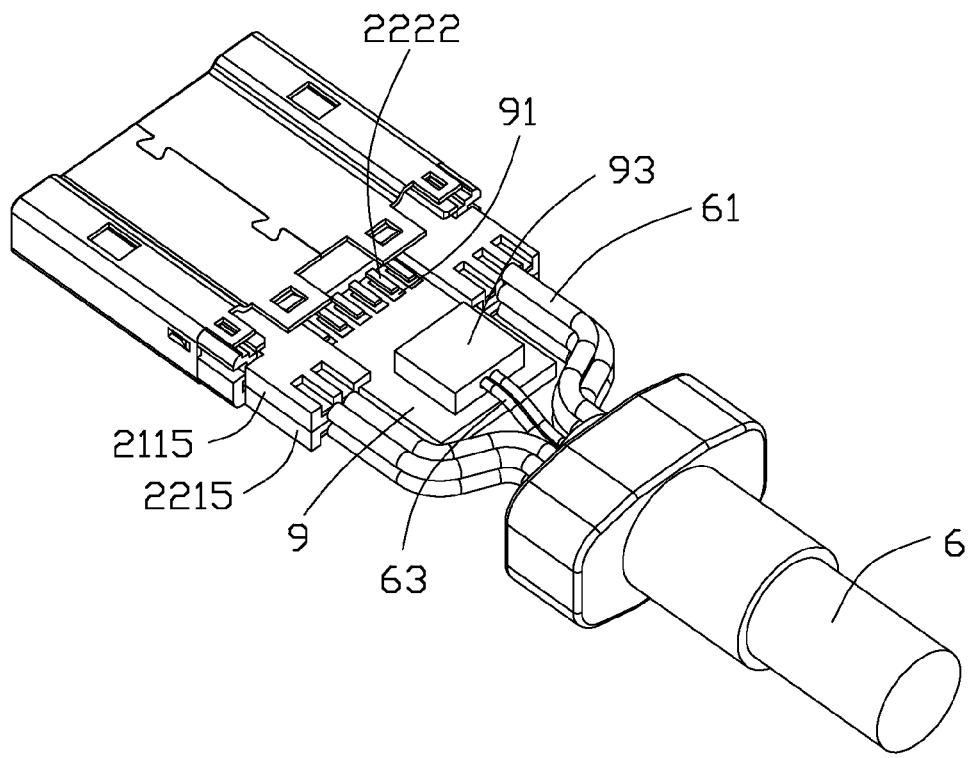
FIG. 5 is other partially assembled, perspective view of the cable assembly.
Figure 6:
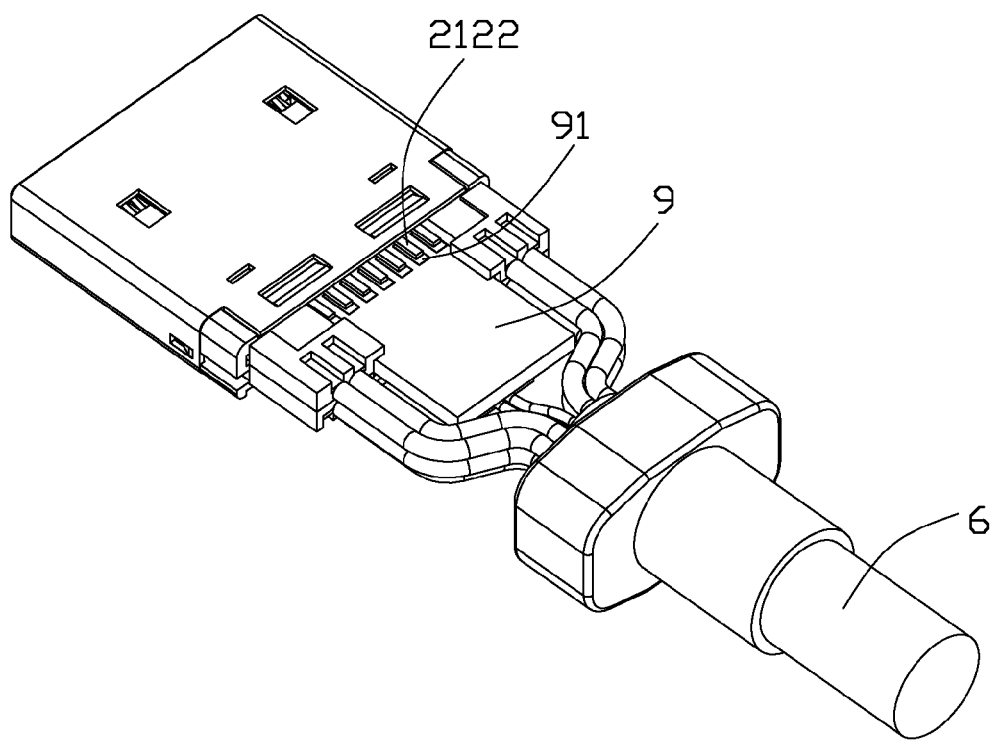
FIG. 6 is similar to FIG. 5, but viewed from other direction.
Figure 7:
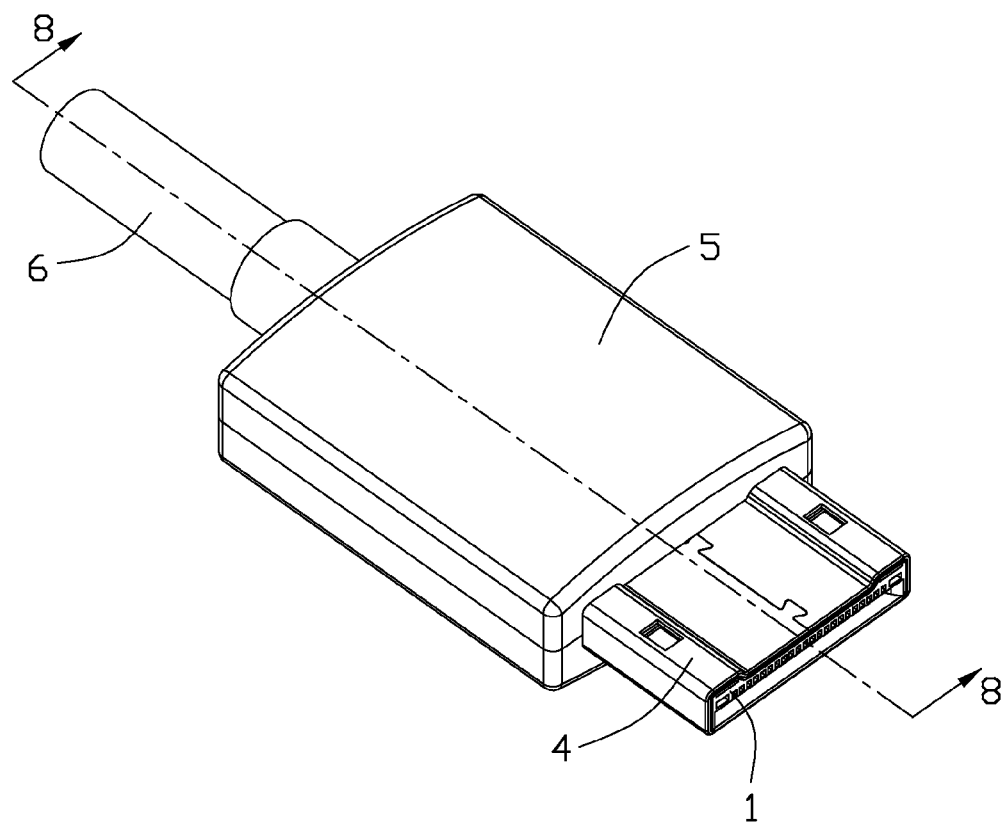
FIG. 7 is an assembled, perspective view of the cable assembly.
Figure 8:
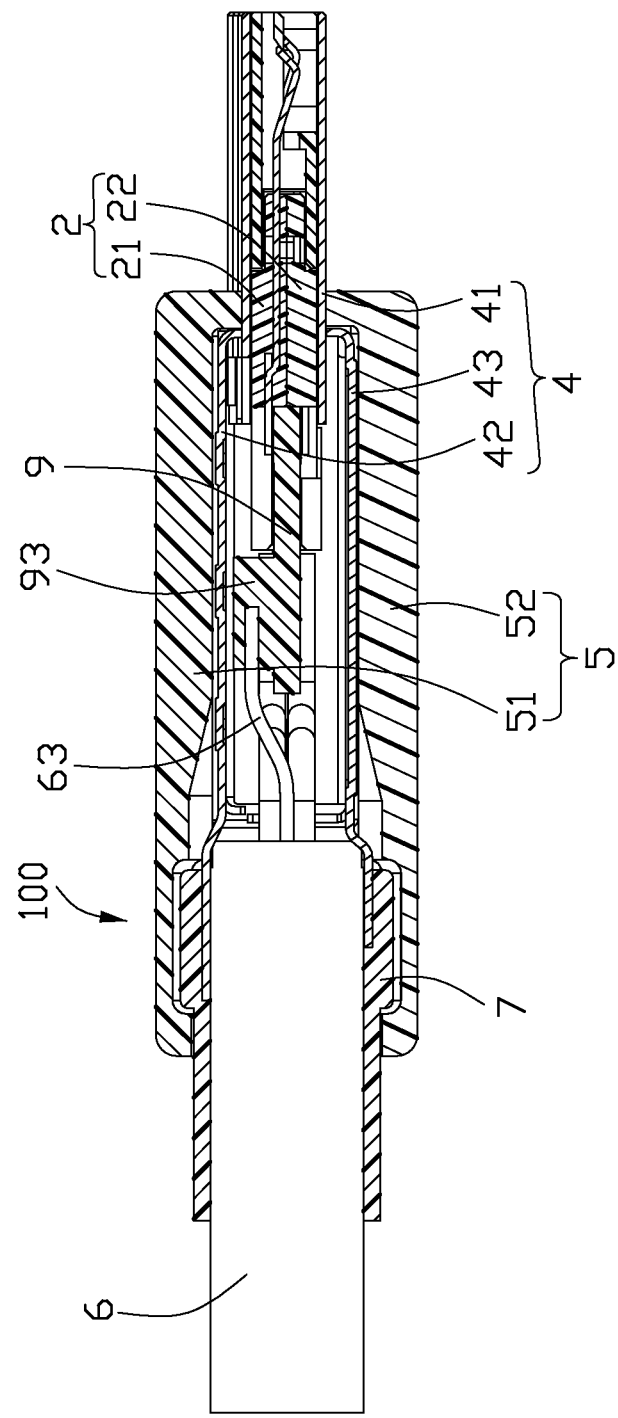
FIG. 8 is a cross-section view taken along line 6-6 of FIG. 5.

The first terminal module 21 and the second terminal module 22 are assembled together, with the first insulator 211 and the second insulator 221 stacked with each other, the wing portions 2115, 2215 overlapping with each other; the contacting portions 2120, 2220 merged into one row, while the tail portions 2122, 2222 separated into two distinct rows along an up-to-down direction. The mounting posts 2110 are inserted into the positioning holes 2210 so as to keep the first terminal module 21 and the second terminal module 22 together. The first terminal module 21 and the second terminal module 22 are assembled to the insulative housing 1, with front segments of the first and second insulators 211, 221 inserted into the mounting recess 102, the contacting portions 2120, 2220 accommodated in the mating cavity 104. Two wing portions 2115, 2215 overlap with each other and located behind the two mounting arms 12. Lateral edges of the first and second insulators 211, 221 are positioned in positioning grooves 123 defined in inner side of the mounting arms 12. Referring to FIG. 3, there are twenty two terminal slots 106 located in the mounting cavity 104 for receiving the contacting portions 2120, 2220 therein. For the first terminal group 212, there are thirteen terminal elements which are oddly numerated as c1 . . . c21. For the second terminal group 222, there are thirteen terminal elements which are evenly numerated as c2 . . . c22. It should be noted that c1, c2 . . . c21, c22 represent terminals located in the corresponding terminal slots 106.

The metallic shell 4 has a first shell 41, a second shell 42 and a third shell 43.

The first shell 41 includes a frame 411 to accommodate the main portion 10 therein. A first engaging portion 411a projects backward from the top side of the frame 411. There are two positioning holes 4110a defined in the first engaging portion 411a to latch with the protruding portions 2211 of the first terminal module 21. A second engaging portion 411b projects backward therefrom. There are two positioning holes 4110b defined in the second engaging portion 411b to latch with the protruding portions 2211 of the second terminal module 22.

The second shell 42 includes a U-shaped main body 421 and a cable holder 423 integrated with the main body 421 and projecting backwardly. The third shell 43 includes an inverted U-shaped main portion 431 and a tail 433 extending rearward. The second shell 42 and the third shell 43 can be combined together along a vertical direction.

The external cover 5 includes an upper cover 51 and a bottom cover 52. The upper cover 51 has a first hollow 511 and a second hollow 512 disposed behind the first hollow 511. A rectangular shaped opening is located in the front portion of the upper cover 51, and the opening further communicates with the first hollow 511. A semicircular shaped outlet is defined in the rear portion of the upper cover 51 and communicated with the second hollow 512.

The bottom cover 52 is similar to the upper cover 51, and also has a first hollow 521 and a second hollow 522 disposed behind the first hollow 521. An opening is located in the front portion of the bottom cover 52, and the opening further communicates with the first hollow 521. A semicircular shaped outlet is defined in the rear portion of the bottom cover 52 and communicated with the second hollow 522.

The cable 6 is a hybrid cable and includes a number of copper wires 61, fiber wires 63 and an insulative jacket 60 enclosing the copper wires 61, the fiber wires 63. The strain relief member 7 is molded over a front segment of the cable 6. In addition, the strain relief member 7 is held in the second hollows 512, 522.

The printed circuit board assembly (PCBA) 9 includes a substrate 90, a plurality of conductive pads 91 formed on a front segment of the substrate 90. There is a photoelectric conversion device 93 mounted to the substrate 90.

The PCBA 9 is disposed behind the terminal module 2 and further sandwiched between the two wing portions 2115, 2216 of the first and second terminal modules 21, 22. In addition, lateral edges of the substrate 90 are held by ribs 2118, 2218 of the first and second terminal modules 21, 22. The first and second terminal modules 21, 22 are electrically connected with the PCBA 9, with the tail portions 2122, 2222 of the first terminals 212a and the second terminals 212b soldered to the conductive pads 91 of the substrate 90. The fiber wires 63 are optically connected to the photoelectric conversion device 93. Thus, first signal transmitting line is formed between the fiber wires 63, the photoelectric conversion device 93 and the first terminals 212a and the second terminals 212b. In addition, the copper wires 61 are put into the terminal grooves 2116, 2216 to be soldered to the tail portion 2122b, 2222b of the first additional terminals 212b and the second additional terminals 222b. Thus, second signal transmitting line is formed. The first signal transmitting line is capable of transmitting high frequency signal, while the second signal transmitting line is capable of transmitting low frequency signal or electrical power. Therefore, the cable assembly is lower profile and compatible in different signal transmitting, also has lower cost compared with a conventional copper cable.

An arrangement of the first terminals 212a, 222a is in accordance with Digital Interactive Interface for Video & Audio (DiiVA) standard. There are three differential pairs consisted of six signal terminals located between grounding terminals. The differential pairs for high-speed transmitting used for conveying video signals. And a pair of signal terminals disposed aside the three differential pairs used for audio signals. The differential pairs of the first and second terminals 212a, 222a are electrically connected to the photoelectric conversion device 93.

It will be understood that the invention may be embodied in other specific forms without departing from the spirit or central characteristics thereof The present examples and embodiments, therefore, are to be considered in all respects as illustrative and not restrictive, and the invention is not to be limited to the details given herein.

What is claimed is:

1. A cable assembly, comprising:
   an insulative housing;
   a first terminal module and a second terminal module assembled to the insulative housing, the first terminal module having first terminals and first additional terminals, the second terminal module having second terminals and second additional terminals, the first additional terminals having tail portions disposed backward than tail portions of the first terminals, and the second additional terminals having tail portions disposed backward than tail portions of the second terminals;
   a photoelectric conversion device electrically connected with the first terminals and the second terminals; and
   a cable including fiber wires and copper wires, the fiber wires optically connected to photoelectric conversion device, the copper wires electrically connected to the first additional terminals and the second additional terminals.

2. The cable assembly as recited in claim 1, wherein the first additional terminals are disposed at opposite sides of the first terminals, and the second additional terminals are disposed at opposite sides of the second terminals.

3. The cable assembly as recited in claim 1, wherein the first terminal module further has a first insulator combined with the first terminals and the first additional terminals.

4. The cable assembly as recited in claim 3, wherein there are two wing portions extending backwardly from a back segment of the first insulator, and the two wing portions are spaced apart from each other.

5. The cable assembly as recited in claim 4, wherein the first terminals have tail portions disposed between the two wing portions, and the first additional terminals have tail portions accommodated in terminal grooves defined in the wing portions.

6. The cable assembly as recited in claim 1, wherein the second terminal module further has a second insulator combined with the second terminals and the second additional terminals.

7. The cable assembly as recited in claim 6, wherein there are two wing portions extending backwardly from a back segment of the second insulator, and the two wing portions are spaced apart from each other.

8. The cable assembly as recited in claim 7, wherein the second terminals have tail portions disposed between the two wing portions, and the second additional terminals have tail portions accommodated in terminal grooves defined in the wing portions.

9. The cable assembly as recited in claim 1, wherein the first terminals and the second terminals are arranged in accordance to DiiVA standard.

10. A cable assembly, comprising:
    an insulative housing;
    a first terminal module and a second terminal module assembled to the insulative housing, the first terminal module having first terminals and first additional terminals, the second terminal module having second terminals and second additional terminals;
    a printed circuit board assembly having a substrate and a photoelectric conversion device mounted to the substrate which electrically connected with the first terminals and the second terminals;
    a cable including fiber wires and copper wires, the fiber wires optically connected to photoelectric conversion device, the copper wires electrically connected to the first additional terminals and the second additional terminals; wherein
    a first insulator is combined with the first terminals and the first additional terminals, and a second insulator is combined with the second terminals and the second additional terminals; wherein each of the first insulator and the second insulator has two wing portions extending backwardly therefrom, and the two wing portions are spaced apart from each other.

11. The cable assembly as recited in claim 10, wherein there are two ribs attached to inner edges of the two wing portions of both the first insulator and the second insulator, and lateral edges of the substrate are sandwiched between the ribs of the wings.

12. The cable assembly as recited in claim 11, wherein the wing portions of the first insulator and the second insulator overlap with each other.

13. The cable assembly as recited in claim 12, wherein tail portions of the first terminals and the second terminals are disposed between the wing portions of the first insulator and the second insulator.

14. The cable assembly as recited in claim 13, wherein tail portions of the first additional terminals are received in terminal grooves defined in the wing portions of the first insulator, and tail portions of the second additional terminals are received in terminal grooves defined in the wing portions of the second insulator.

15. A cable connector assembly comprising:
    an insulative housing defining a front mating port;
    a plurality of terminals side by side arranged with one another with corresponding contacting sections exposed in the mating port, said terminal being arranged with first and second groups in which the first group is for optical conversion and the second group is for electrical transmission;
    a photoelectric conversion device located behind the housing and electrically connected to the terminals of the first group; and
    a cable including fiber wires connected to the photoelectric conversion device and cooper wires connected to the terminals of the second group.

16. The cable connector assembly as claimed in claim 15, wherein tails of the terminals of the first group are located in front of those of the second group.

17. The cable connector assembly as claimed in claim 16, wherein the terminals are integrated by an insulator which defines a notch into which a printed circuit board of the photoelectric conversion device is received for connection with the terminals of the first group.

\* \* \* \* \*